J. A. JOHNSON.
LAWN EDGER.
APPLICATION FILED SEPT. 30, 1912.
1,067,032.
Patented July 8, 1913.
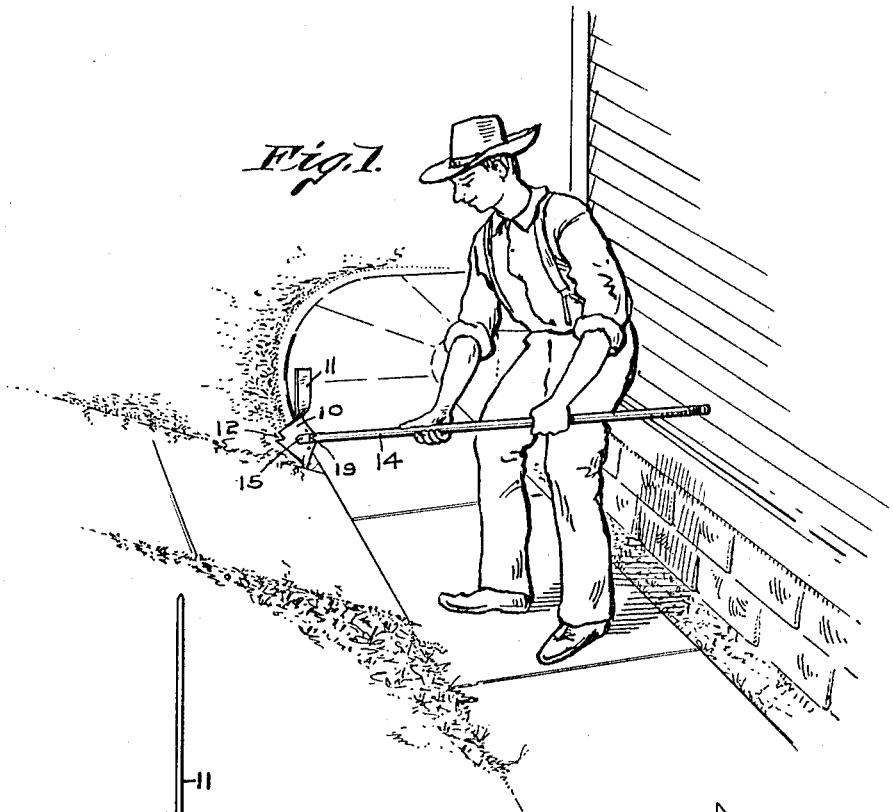
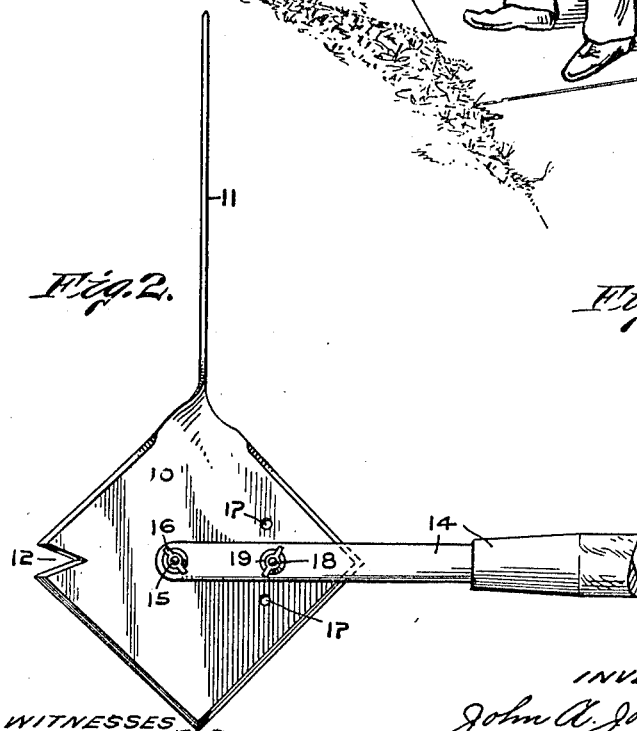
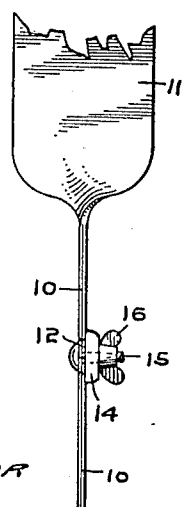

UNITED STATES PATENT OFFICE.

JOHN A. JOHNSON, OF GREENFIELD, INDIANA.

LAWN-EDGER.

1,067,032.

Specification of Letters Patent.

Patented July 8, 1913.

Application filed September 30, 1912. Serial No. 723,258.

*To all whom it may concern:*

Be it known that I, JOHN A. JOHNSON, a citizen of the United States, residing at Greenfield, in the county of Hancock and State of Indiana, have invented certain new and useful Improvements in Lawn-Edgers, of which the following is a specification.

This invention relates to lawn edgers; and the object of the invention is to provide a tool of the above character which will be simple in construction, efficient in operation and cheap to manufacture.

I accomplish the above objects of the invention by means of the lawn edger illustrated in the accompanying drawings, forming a part hereof, in which—

Figure 1 is a perspective view of my improved lawn edger, the same being shown in operation. Fig. 2 is an enlarged view in side elevation of the lawn edger, a portion of the handle being broken away. Fig. 3 is a front elevation of the construction shown in Fig. 2, except that the hoe-blade portion of the tool is broken away.

Referring to the drawings, the lawn edger consists, primarily, of a rectangular piece of sheet steel 10 which terminates at one of the corners in a hoe-blade 11, this latter blade being bent to stand at right angles to the blade 10 and handle. The edges of the blade 10 are beveled so as to provide cutting edges by which the grass may be trimmed along walks, curbings, etc. To add further utility to the tool I provide a V-shaped notch 12 in that corner of the blade 10, said notch lying in a parallel plane with the handle. This notch, or recess, is brought into play when it is desired to eradicate dandelions, plantains and similar obnoxious weeds from the lawn. The opposing edges of the blade 10 which form the margin of the notch 12 are beveled to provide cutting edges, and the converging cutting edges of said notch will readily sever the stalk of the weed when the blade 10 is pushed into the ground thus allowing the stalk of the weed to move upward into said notch 12. The blade 10 is preferably provided with a handle 14 of sufficient length to permit the operator to assume and maintain a standing position. The handle 14 is pivotally connected to the blade 10 by means of a bolt 15 and wing-nut 16 which allows the parts to be disconnected when it is desired to grind or sharpen the cutting edges of the blade 10.

To enable the position of the blade 10 to be changed with respect to the handle 14, so as to accommodate persons of different heights, and also to present different parts of the cutting edges of the blade 10 to the ground, I provide means for adjusting said blade with respect to the handle 14. This is accomplished by providing the blade 10 with a plurality of holes 17 arranged on an arc of a circle the center of which is common with the bolt 15. The handle 14 is provided with an aperture which registers with the holes 17 and by means of the bolt 18 and the wing-nut 19 the blade 10 may be moved to bring any one of the holes 17 into registration with the hole in the handle 14, when said blade may be rigidly held by passing the bolt 18 through the blade and handle and placing the wing-nut 19 in position.

As heretofore mentioned, the blade 10 terminates in a hoe-blade 11, the free end of which is beveled so as to provide a cutting edge. This blade simply enlarges the scope and utility of the tool, allowing irregular ground surface to be leveled and can be used in cutting the larger stalks of weeds, roots and shrubbery.

It will be noted, that I have provided a simple and inexpensive tool, capable of being used around any yard where walks bisect the lawns, and where neatness and attractiveness in landscape architecture are desired.

Having thus fully described my said invention, what I desire to secure by Letters Patent, is—

1. A lawn edger comprising a rectangular unitary sheet structure provided with cutting edges and terminating in a transverse blade, said rectangular structure being provided with a notch in the edge opposite the handle, and a handle for holding said structure in position for cutting.

2. A lawn edger comprising a rectangular unitary sheet structure provided with cutting edges and terminating in a transverse blade, said rectangular structure being provided with a notch in the edge opposite the handle, a handle for pivotally engaging said rectangular structure, and means for adjustably securing said structure on said handle.

In witness whereof, I have hereunto set my hand and seal at Indianapolis, Indiana, this 27th day of September, A. D. one thousand nine hundred and twelve.

JOHN A. JOHNSON. [L. S.]

Witnesses:
F. W. WOERNER,
L. B. WOERNER.

Copies of this patent may be obtained for five cents each, by addressing the "Commissioner of Patents, Washington, D. C."